(12) United States Patent  
Kehlenbeck et al.

(10) Patent No.: US 11,492,093 B2  
(45) Date of Patent: Nov. 8, 2022

(54) SYSTEM FOR DISPLAYING THE STATE OF AT LEAST ONE CARGO DOOR OF AN AIRCRAFT

(71) Applicant: Airbus Operations GmbH, Hamburg (DE)

(72) Inventors: Ulf Kehlenbeck, Hamburg (DE); Matias Mail, Hamburg (DE); Sascha Rodewald, Hamburg (DE); Philippe Raviart, Hamburg (DE)

(73) Assignee: AIRBUS OPERATIONS GMBH HAMBURG, Hamburg (DE)

( * ) Notice: Subject to any disclaimer, the term of this patent is extended or adjusted under 35 U.S.C. 154(b) by 758 days.

(21) Appl. No.: 16/424,664

(22) Filed: May 29, 2019

(65) Prior Publication Data

US 2019/0367148 A1 Dec. 5, 2019

(30) Foreign Application Priority Data

May 31, 2018 (DE) .......................... 102018004342.9

(51) Int. Cl.
*B64C 1/14* (2006.01)
*G07C 5/00* (2006.01)
(Continued)

(52) U.S. Cl.
CPC ........ *B64C 1/1415* (2013.01); *B64D 45/0005* (2013.01); *G07C 5/008* (2013.01); *B64C 2001/009* (2013.01)

(58) Field of Classification Search
CPC .... B64C 1/1415; B64D 45/0005; G07C 5/008
See application file for complete search history.

(56) References Cited

U.S. PATENT DOCUMENTS 5,735,487 A 4/1998 Abild et al.
6,158,692 A 12/2000 Abild et al.
(Continued)

FOREIGN PATENT DOCUMENTS

DE 69621316 T2 9/2002
EP 1534588 B1 6/2005
(Continued)

OTHER PUBLICATIONS

French Search Report for corresponding French Patent Application No. 1905824 dated Oct. 14, 2020.
German Search Report; priority document.

*Primary Examiner* — Hongmin Fan
(74) *Attorney, Agent, or Firm* — Greer, Burns & Crain, Ltd.

(57) ABSTRACT

A system for displaying the state of an aircraft cargo door. The cargo door is configured pivot between a closed position and an open position, the closed and open positions defining a pivoting range. The cargo door is lockable both in the closed position and in the open position. The cargo door is in a regular state when locked in the closed position or the open position. The cargo door is in a warning state when in the pivoting range between the closed position and open position. The cargo door is in a faulty state when unlocked in the closed position or unlocked in the open position or when there is an obstacle in the pivoting range. The cargo door comprises at least one indicator configured to display the respective state of the cargo door, the indicator being detectable from a distance of at least 7.5 m.

10 Claims, 3 Drawing Sheets

(51) Int. Cl.
B64D 45/00 (2006.01)
B64C 1/00 (2006.01)

(56) References Cited

U.S. PATENT DOCUMENTS

| | | | |
|---|---|---|---|
| 7,207,524 B2 | 1/2007 | Puschmann et al. | |
| 9,469,413 B2 | 10/2016 | Waigl | |
| 2003/0038713 A1* | 2/2003 | Plude | B64C 1/14 340/960 |
| 2010/0001136 A1* | 1/2010 | Wilson | B64C 1/1415 292/336.3 |
| 2015/0145702 A1* | 5/2015 | Waigl | B64C 1/1423 340/945 |
| 2018/0111480 A1* | 4/2018 | Machak | G06V 20/56 |

FOREIGN PATENT DOCUMENTS

| | | | |
|---|---|---|---|
| EP | 2878530 A1 | | 6/2015 |
| GB | 2425638 A | | 11/2006 |
| JP | 2003300462 | * | 10/2003 |
| WO | WO 2012110569 | * | 8/2012 |

* cited by examiner

SYSTEM FOR DISPLAYING THE STATE OF AT LEAST ONE CARGO DOOR OF AN AIRCRAFT

CROSS-REFERENCES TO RELATED APPLICATIONS

This application claims the benefit of German patent application No. 10 2018 004 342.9 filed on May 31, 2018, the entire disclosures of which are incorporated herein by way of reference.

FIELD OF THE INVENTION

The present invention relates to a system for displaying the state of at least one cargo door of an aircraft, and to an aircraft having such a system. The present application also relates to a cargo door.

BACKGROUND OF THE INVENTION

Outward-opening doors of pressurizable aircraft must meet specific safety regulations, since an incorrectly closed door prevents the starting of the aircraft or necessitates abortion of a flight. Furthermore, there are warning systems which measure and indicate when there is a sufficiently small residual pressure in the aircraft cabin, in order that a door can be opened in a controlled way either from the outside by ground personnel or from the inside by cabin personnel. Such a warning system can, for example, be a small warning lamp in the interior of the door viewing window or an acoustic signal transmitter (cf. EP 1534588 B1). In cargo doors, use is, in turn, frequently made of a control panel, with which the state of a cargo door can be monitored from a distance. For example, U.S. Pat. No. 5,735,487 describes such a panel. However, the pressure state must nevertheless be read off directly on the cargo door. This necessitates corresponding personnel effort.

During an automated loading or unloading process, which is controlled by a single person under time pressure by remote control from a greater distance and is monitored or else controlled completely by means of suitable sensors, it is, however, no longer possible in the available time to perform such a state verification directly on the cargo door. In particular, it is forbidden to park vehicles behind the so-called safety line ("standard safety line", at least 7.5 m distance from the aircraft), without previously having to stop. It is therefore an object of the present application to provide a system which permits the detection of a state of a cargo door from a greater distance, so that an aircraft can be loaded and/or unloaded automatically as smoothly as possible.

SUMMARY OF THE INVENTION

The system according to the invention for displaying the state of a least one cargo door of an aircraft has a cargo door which is designed to be pivoted between a closed position and an open position. Here, the closed position and the open position define a pivoting range. The cargo door can be locked both in its closed position and in its open position. The cargo door is in a regular state when it is locked in its closed position or its open position, the cargo door is in a warning state when it is in the pivoting range between the closed position and open position, and the cargo door is in a faulty state when it is unlocked in its closed position or unlocked in its open position or when there is an obstacle in the pivoting range. Furthermore, the cargo door comprises at least one indicator for displaying its respective state, the indicator being visually detectable at least beginning from a distance of approximately 7.5 meters. This is the distance at which a vehicle which is approaching a parking aircraft must stop. Preferably, the indicator can be seen at up to a distance of about 50 m, so that the automated loading and unloading can proceed without any delay or without any relatively great delay.

This is possible, for example visually and/or acoustically, for example by means of a correspondingly large or intensive signal.

In principle, in particular, ground personnel working on their own or a transport vehicle must be given an indication during an automated loading and unloading process as to whether there is a regular state (e.g., when the cargo door is in a planned unlocked or locked unclosed or locked open position), a faulty state (e.g., a malfunction of a latch or lock of the cargo door) or a warning state (e.g., in the event of movement of the cargo door). Faulty latching can be caused, for example, by an obstacle in the region of the mechanical latch or too high an internal pressure in the aircraft.

The cargo door according to the invention has—like all doors—an outer door leaf surface and an inner door leaf surface, the at least one indicator being arranged on the outer door leaf surface. (In principle, it is, of course, also possible for an indicator to be present in the inner region of the aircraft or on the inner door leaf surface, but this variant will not be discussed here.) Such a positioning makes it possible for a single worker, on the so-called one-man-ramp, to keep the cargo door in view while he is simultaneously monitoring the loading or unloading process of items of freight: as long as the cargo door is in its closed position or in the vicinity thereof in its pivoting range, such an indicator is easily visible. In addition, for a transport vehicle which permits an automatic loading and unloading process and approaches the aircraft from outside, this indicator or this item of corresponding information is easily accessible by means of suitable sensors. Such sensors can, for example, be of an optical and/or acoustic nature or communicate with the indicator on a radio basis: in this case, the sensor of the transport vehicle receives the corresponding signal from the indicator. If radio-based communication is chosen, it is, of course, necessary for the indicator on the aircraft or on the cargo door additionally to have a transmitting function.

Advantageously, the at least one indicator can alternatively or additionally also be arranged on the outer edge of the cargo door. By means of this positioning, it is possible for the ground personnel or the transport vehicle to detect the state of the cargo door even when it is wide open, so that the outer door leaf is no longer easily visible from the ground.

Furthermore, or instead of the outer edge positioning, the at least one indicator for displaying the respective state of the cargo door can also be arranged on a surface of the aircraft. In this way, firstly an improved visual check of the state of the cargo door is possible. Preferably, this would be the aircraft surface adjacent to the cargo door opening, that is to say, so to speak, the cargo door frame or the border of the cargo door in the closed state. This has the advantage that the ground personnel or the transport vehicle can keep the relevant regions to be observed easily in view or in the detection range. In this way, such an indicator can also, in particular, be a constituent part of an intelligent video or distance monitoring system for an automated loading and unloading process.

The indicator according to the invention preferably comprises lighting means, which permit a large-area or intensive display of a state from more than 7.5 m. These can be, for example, LEDs, which light up in different colors and/or intensities or display the state of the cargo door in another way (e.g., by means of a (e.g., colored) label such as "Locked," "Open," or "Moving").

Alternatively or additionally, the at least one indicator can comprise acoustic means which permit a state indication from more than 7.5 m. Such an acoustic notification is carried out, for example, by means of different frequencies, intensities or sound sequences.

The system according to the invention for displaying the state of a cargo door of an aircraft also preferably comprises a remote control panel, with the aid of which the cargo door can be moved into its closed position and its open position, the remote control panel comprising an indicator for displaying the state of the least one cargo door. Such a remote control panel can not only be a mobile panel but, for example, can also be arranged in a transport vehicle. In this way, not only is the state of the cargo door be displayed to the ground personnel monitoring a loading or unloading process or the sensor in the transport vehicle by the indicator on the door or in the region of the aircraft surface adjacent to the cargo door opening, i.e., the border of the cargo door in the closed state, but also on the panel with which the freight is conveyed into the aircraft or out of the letter under remote control. This makes it possible also to have the states of the cargo door in view on the panel and, at the same time, also represents a comparison of the extent to which the indicator on the remote control panel agrees with the indicator on the cargo door or the region around the cargo door. In this way, in principle, verification of a data link is possible.

The remote control panel can be either portable or stationary. The portable remote control panel can comprise so-called handhelds, while the variant installed in a stationary manner can, for example, be fixed to a ground station (e.g., a transport vehicle) or directly on or in the aircraft.

The system according to the invention is coupled to an aircraft when installed. The aircraft has a freight or cargo region, in which freight can be moved in or out automatically. Here, appropriate sensors for checking the state of the cargo door are located on the latches, the locks, in the respective closed position and open position. Furthermore, there are preferably also sensors for monitoring the pivoting range, in order, if necessary, to detect malfunctions of the cargo door movement or obstacles located in the pivoting range. These monitoring sensors can be, for example, video cameras or ultrasound-based solutions.

BRIEF DESCRIPTION OF THE DRAWINGS

The invention will be explained below with reference to the drawings.

DETAILED DESCRIPTION OF THE PREFERRED EMBODIMENTS

Figure 1A:
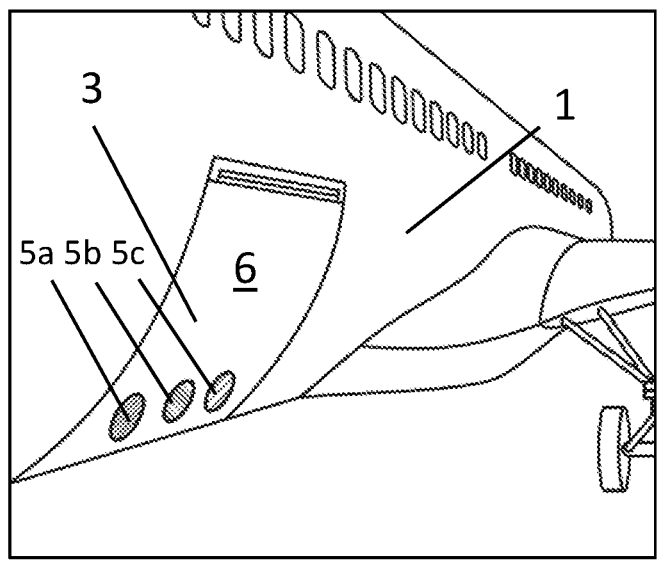
FIG. 1a is a perspective outer view of an aircraft with a closed cargo door according to the invention having an indicator according to the invention.
Figure 1B:
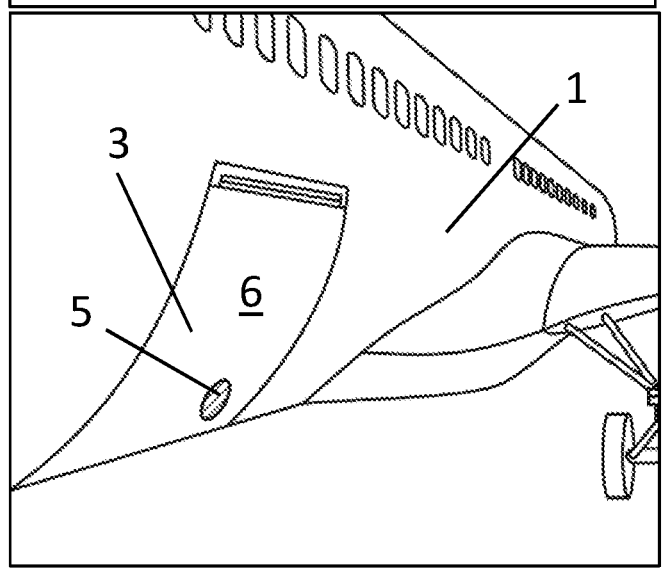
FIG. 1b is a perspective outer view of an aircraft with a closed cargo door according to the invention having an indicator according to the invention.

In FIG. 1a, an aircraft 1 having a closed cargo door 3 according to the invention can be seen perspectively from outside. Arranged on this cargo door 3 are three indicators 5a, 5b, 5c. These can be, for example, three different optical indicators, which can have different colors or intensities. It is not just conceivable for visible frequencies to be used but also, for example, UV or IR frequencies that are invisible to the human eye. As can be seen in FIG. 1b, it is also not only possible for a plurality of indicators for different states to be used but, if appropriate, also only one indicator 5, which can indicate different states. These are, in particular, a regular state (when the cargo door is locked in its closed position or its open position), a warning state (when the cargo door 3 is located between the closed position and open position in the pivoting range), and a faulty state (when the cargo door is unlocked in its closed position or unlocked in its open position or when there is an obstacle in the pivoting range). In each case, the indicator 5 for displaying its respective state is detectable at least from a distance of approximately 7.5 m to approximately 50 m. The detection is preferably carried out visually or acoustically, but radio-based or other solutions are also conceivable.

Figure 1C:
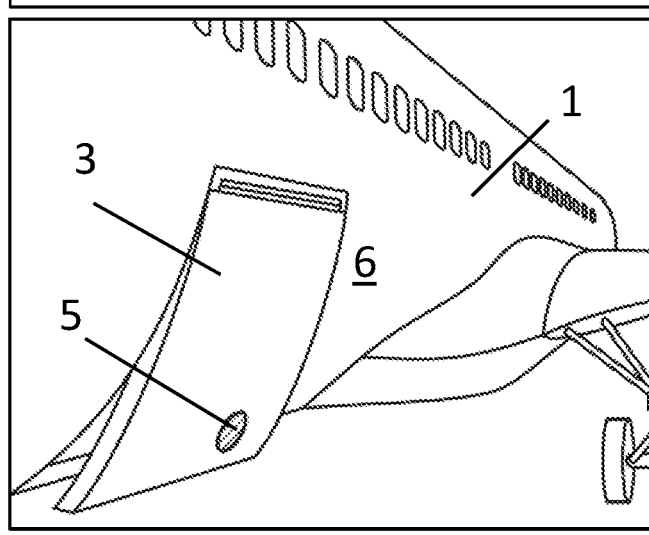
FIG. 1c is a perspective outer view of an aircraft with a cargo door according to the invention located in the pivoting range and having an indicator according to the invention.

FIG. 1c shows a cargo door 3 which is in its pivoting range and has an indicator 5 which indicates a (warning) state. The indicator 5 is, in each case, arranged on the outer door leaf surface 6 of the cargo door 3 in the FIGS. 1a, b, and c.

Figure 2A:
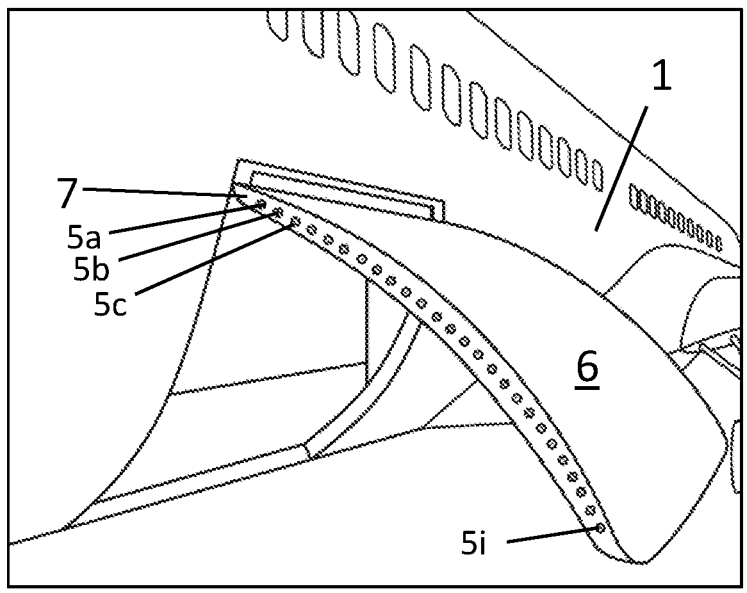
FIG. 2a is a perspective outer view of an aircraft with a cargo door according to the invention located in the pivoting range and having an indicator according to the invention.
Figure 2B:
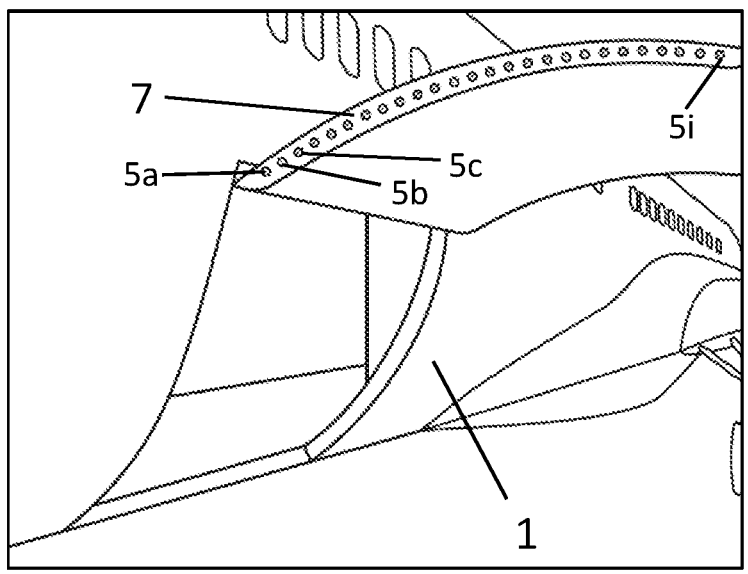
FIG. 2b is a perspective outer view of an aircraft with a cargo door according to the invention located in the open position and having an indicator of according to the invention.

In FIGS. 2a and 2b, it is possible to see a cargo door 3 in which the indicators 5a, 5b, 5c . . . 5i are arranged on the outer edge 7 of the cargo door 3. In FIG. 2a, the indicators 5a, 5b, 5c . . . 5i indicate a warning state, since the cargo door 3 is in its pivoting range. The indicators 5a, 5b, 5c . . . 5i in FIG. 2b, which represent a cargo door 3 in its open, locked state, in turn shows a regular state.

Besides or apart from optical means, such as lighting means, the indicator, in the present case comprising the indicators 5a, 5b, 5c . . . 5i, can also comprise acoustic means, so that specific sounds or sequences of sounds are used to represent a specific state of the cargo door 3.

Figure 3:
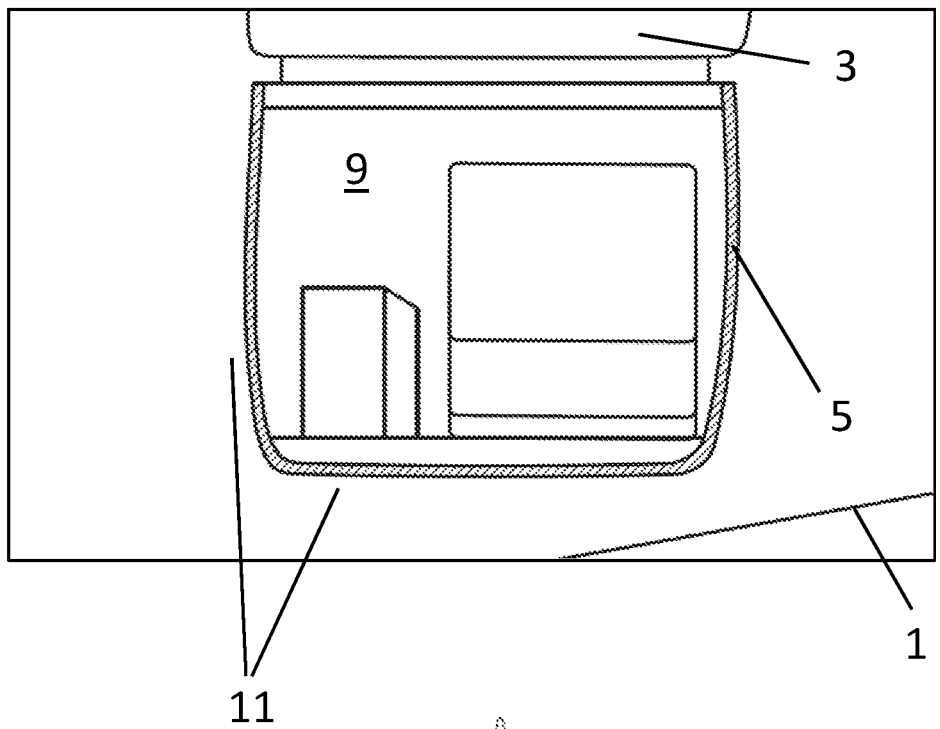
FIG. 3 is a front view of a cargo door opening having an indicator according to the invention in the region of the aircraft surface adjacent to the cargo door opening, i.e., the border of the cargo door, in the closed state.

FIG. 3 shows a (further) indicator for displaying the respective state of the cargo door 3, which is arranged on a surface of the aircraft 1. In the figure, the indicator 5 is arranged in the region of the aircraft surface 11 adjacent to the cargo door opening 9, i.e., in the region of the border of the cargo door 3 in the closed state. In this way, the state can be detected easily even when the cargo door 3 is open, and otherwise has only an indicator on its outer door leaf 6. Such an indicator 5 in the border can easily be seen from at least 7.5 m.

Figure 4:
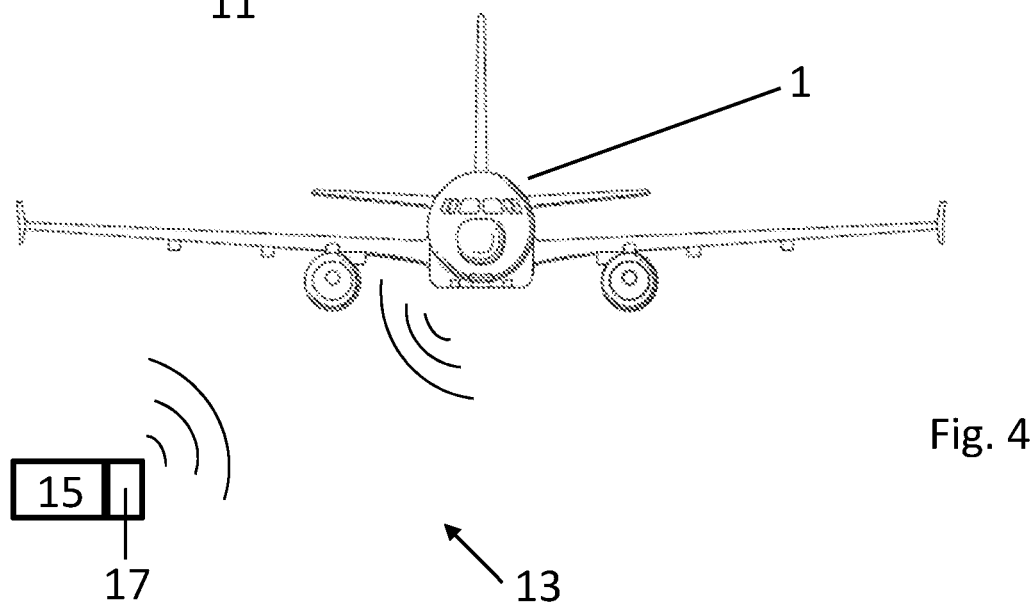
FIG. 4 is a front view of an aircraft according to the invention with a schematic illustration of the system according to the invention.

FIG. 4 shows, by way of example, an aircraft 1 which can be equipped with a system 13 according to the invention for displaying the state of a least one cargo door 3. Here, for example, a transport vehicle 15 can have a remote control panel 17, in order to be able to read and also to display the at least one indicator of the cargo door of the aircraft 1. In this way, automatic loading or unloading by the ground personnel or the transport vehicle 15 itself can be controlled on the basis of the state of the cargo door 3.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SYMBOLS

1 Aircraft
3 Cargo door
5 Indicator
5a, 5b, 5c . . . 5i Multiplicity of optical indicators
6 Outer door leaf surface of the cargo door
7 Outer edge of the cargo door
9 Cargo door opening
11 Aircraft surface adjacent to the cargo door opening
13 System according to the invention for displaying the state of at least one cargo door
15 Transport vehicle
17 Remote control panel

The invention claimed is:

1. A system for displaying a state of a cargo door of an aircraft, comprising:
   the cargo door being configured to be pivoted between a closed position and an open position, the closed position and the open position defining a pivoting range,
   the cargo door being lockable both in the closed position and in the open position,
   the cargo door being in a regular state when locked in the closed position or the open position,
   the cargo door being in a warning state when in the pivoting range between the closed position and the open position,
   and the cargo door being in a faulty state, the faulty state defined by each of the cargo door being unlocked in the closed position, the cargo door being unlocked in the open position, and when there is an obstacle in the pivoting range of the cargo door,
   wherein the cargo door comprises at least one indicator configured to display the respective state of the cargo door, the indicator being detectable from a distance of at least 7.5 m.

2. The system according to claim 1, wherein the cargo door has an outer door leaf surface and an inner door leaf surface, and wherein the indicator is arranged on the outer door leaf surface.

3. The system according to claim 1, wherein the indicator is arranged on an outer edge of the cargo door.

4. The system according to claim 1, wherein a further indicator for displaying the respective state of the cargo door is arranged on a surface of the aircraft.

5. The system according to claim 1, wherein the indicator comprises a light.

6. The system according to claim 1, wherein the indicator comprises an acoustic element.

7. The system according to claim 1, wherein the cargo door is configured to be moved into the closed position and the open position by a remote control panel, and wherein the remote control panel comprises an indicator for displaying the state of the at least one cargo door.

8. The system according to claim 7, wherein the remote control panel is portable.

9. The system according to claim 7, wherein the remote control panel is stationary.

10. An aircraft having a system according to claim 1.

* * * * *